(12) United States Patent
Stemen

(10) Patent No.: US 7,698,546 B2
(45) Date of Patent: Apr. 13, 2010

(54) BIOS CONFIGURATION UPDATE TECHNIQUE

(75) Inventor: Patrick L. Stemen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1019 days.

(21) Appl. No.: 11/380,638

(22) Filed: Apr. 27, 2006

(65) Prior Publication Data

US 2007/0255936 A1 Nov. 1, 2007

(51) Int. Cl.
G06F 9/00 (2006.01)
(52) U.S. Cl. .......................... 713/2; 709/223; 713/100; 715/740
(58) Field of Classification Search ................ 713/100, 713/2; 709/223; 715/740
See application file for complete search history.

(56) References Cited

U.S. PATENT DOCUMENTS

| | | | |
|---|---|---|---|
| 5,594,874 A | 1/1997 | Narayanan et al. | |
| 5,903,894 A | 5/1999 | Reneris | |
| 6,594,757 B1 | 7/2003 | Martinez | |
| 6,598,159 B1 | 7/2003 | McAlister et al. | |
| 6,636,961 B1 | 10/2003 | Braun et al. | |
| 6,671,802 B1 | 12/2003 | Ott | |
| 7,114,064 B2 * | 9/2006 | Ramesh et al. ................. | 713/1 |
| 2002/0049898 A1 | 4/2002 | Wang | |
| 2003/0018765 A1 * | 1/2003 | Muhlestein et al. ......... | 709/223 |
| 2003/0065915 A1 | 4/2003 | Yu et al. | |
| 2004/0205329 A1 | 10/2004 | Wu et al. | |
| 2004/0205779 A1 | 10/2004 | Almeida et al. | |

FOREIGN PATENT DOCUMENTS

| | | |
|---|---|---|
| EP | 0636972 A1 | 2/1995 |
| EP | 1574949 A1 | 9/2005 |
| WO | WO0048063 A1 | 8/2000 |

OTHER PUBLICATIONS

Distributed Management Task Force, Inc., Common Information Model (CIM) Infrastructure Specification, DSP0004, Version 2.3 Final, Oct. 4, 2005.*
"Dell OpenManage; Remote BIOS Update", available at http://www.dell.com/downloads/global/solutions/omci_brochure.pdf.
M. Saito, "IPMI and Service Processors: An Open Approach for Remote Monitoring and Control", available at http://www.openipme.org/common/www/pdf/white_papers/IPMI_wp.en.pdf.

(Continued)

*Primary Examiner*—Albert Wang
(74) *Attorney, Agent, or Firm*—Lee & Hayes, PLLC

(57) ABSTRACT

The present BIOS configuration update technique allows a system administrator the ability to remotely configure a set of computing systems from various manufacturers from a single administrator console. A BIOS configuration description is used for defining hardware settings within the computing system. The BIOS configuration description may pre-define a schema that various manufacturers use when designing the interface to the configurable elements within their computing systems. Alternatively, the BIOS configuration description may define a set of rules which the various manufacturers use when designing the interface to their configurable elements within their computing systems. Using the BIOS configuration description, one management application may then access the configurable elements on the computing systems from the various manufacturers.

9 Claims, 7 Drawing Sheets

OTHER PUBLICATIONS

"Remote Hardware Maintenance-BIOS Settings", available at http://publib.boulder.ibm.com/infocenter/pseries/index.jsp?topic=/com.ibm.help.csm.doc/csm_books/csm_admin/am7ad11074.html, retrieved on Apr. 26, 2006.

T. Niemela and L. Vega, "Overview: Freedom for BIOS Limitations", Apr. 28, 2004, available at http://www.deviceforge.com/articles/AT4903582708.html, retreived on Mar. 1, 2006.

PCT International Search Report and Written Opinion mailed on Jun. 28, 2007 for International Application No. PCT/US2007/006032, 8 pages.

M. Saito, "IPMI and Service Processors: An Open Approach for Remote Monitoring and Control", available at http://www.openipme.org/common/www/pdf/white_papers/IPMI_wp.en.pdf. (Internet Archive, Apr. 2006).

"Remote Hardware Maintenance-BIOS Settings", available at http://publib.boulder.ibm.com/infocenter/pseries/index.jsp?topic=/com.ibm.help.csm.doc/csm_books/csm_admin/am7ad11074.html, retrieved on Apr. 26, 2006.

T. Niemela and L. Vega, "Overview: Freedom for BIOS Limitations", Apr. 28, 2004, available at http://www.deviceforge.com/articles/AT4903582708.html, retreived on Mar. 1, 2006.

* cited by examiner

```
[
    WMI,
    Dynamic,
    Provider("WMIProv"),
    DisplayName("Onboard 802.11x Wireless Controller Configuration"),
    Description("Configures the onboard 802.11x wireless controller."),
    Locale(0x409),
    GUID("{2E5EC0CD-748F-4e3f-B63D-6FCBF5AEB60F}")
]
class Onboard80211Wireless:MS_BIOSSettings
{
    [read, key]   string InstanceName;
    [read]        boolean Active;
    [WMIDataID(1),
     Read, Write,
     DisplayName("Enabled"),
     Description("Enables the onboard 802.11x wireless controller."),
     Values{"Disabled", "Enabled"},
     Default(1)
    ]
    boolean Enable;
};
```

*Fig. 3*

BIOS CONFIGURATION UPDATE TECHNIQUE

BACKGROUND

Computing systems have a basic input/output system (BIOS) that controls the hardware elements within the computing systems. For example, BIOS may contain code to control a keyboard, a display screen, disk drives, and the like. Typically, the BIOS is stored in a read-only memory (ROM) chip that is part of the computing system. Because the BIOS is in ROM, it is always available for booting the computing system. In some computing systems, the BIOS may be copied and decompressed from ROM to a faster random access memory (RAM) each time the computing system is booted. This allows faster booting of the computing system and a smaller ROM storage size. The BIOS may also be stored in a flash memory chip that allows the BIOS to be updated if necessary.

In order to configure settings for the hardware elements controlled by the BIOS, a user interacts with a BIOS setup utility provided by a computer system manufacturer (i.e., original equipment manufacturer (OEM)). The BIOS setup utility may be accessed by a user who is physically interacting with the computing system running the local BIOS setup utility. In addition, some manufacturers provide a remote BIOS setup utility that allows a user to configure a computer system across a network. However, both the local utility and the remote utility are system-dependent. Therefore, a remote network utility from one manufacturer is not able to modify BIOS settings on a computing system from another manufacturer. In addition, while interacting with the BIOS setup utility, the operating system is not present. Thus, a system administrator is unable to remotely configure a set of computing systems, with an operating system present, from various manufacturers using an administrative application executing on a single remote administrator console.

SUMMARY

The present BIOS configuration update technique allows a system administrator the ability to remotely configure a set of computing systems from various manufacturers from a single administrator console. A BIOS configuration description is used for defining hardware settings within the computing system. The BIOS configuration description may pre-define a schema that various manufacturers use when designing the interface to the configurable elements within their computing systems. Alternatively, the BIOS configuration description may define a set of rules which the various manufacturers use when designing the interface to their configurable elements within their computing systems. Using the BIOS configuration description, one management application may then access the configurable elements on the computing systems from the various manufacturers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments are described with reference to the following figures, wherein like reference numerals refer to like parts throughout the various views unless otherwise specified. For convenience, the left-most digit of a reference number identifies the particular Figure in which the reference number first appears.

FIG. 3 is an example BIOS configuration description implementing a pre-defined schema for a wireless controller that illustrates an exemplary BIOS configuration description of FIG. 2.

DETAILED DESCRIPTION

The following description is directed at a BIOS configuration update technique that allows one application the ability to configure BIOS settings on computing systems from various manufacturers. In overview, the technique utilizes a BIOS configuration description for describing configurable hardware elements within the computing system. These and other aspects of the present BIOS configuration update technique are now described in detail.

Figure 1:
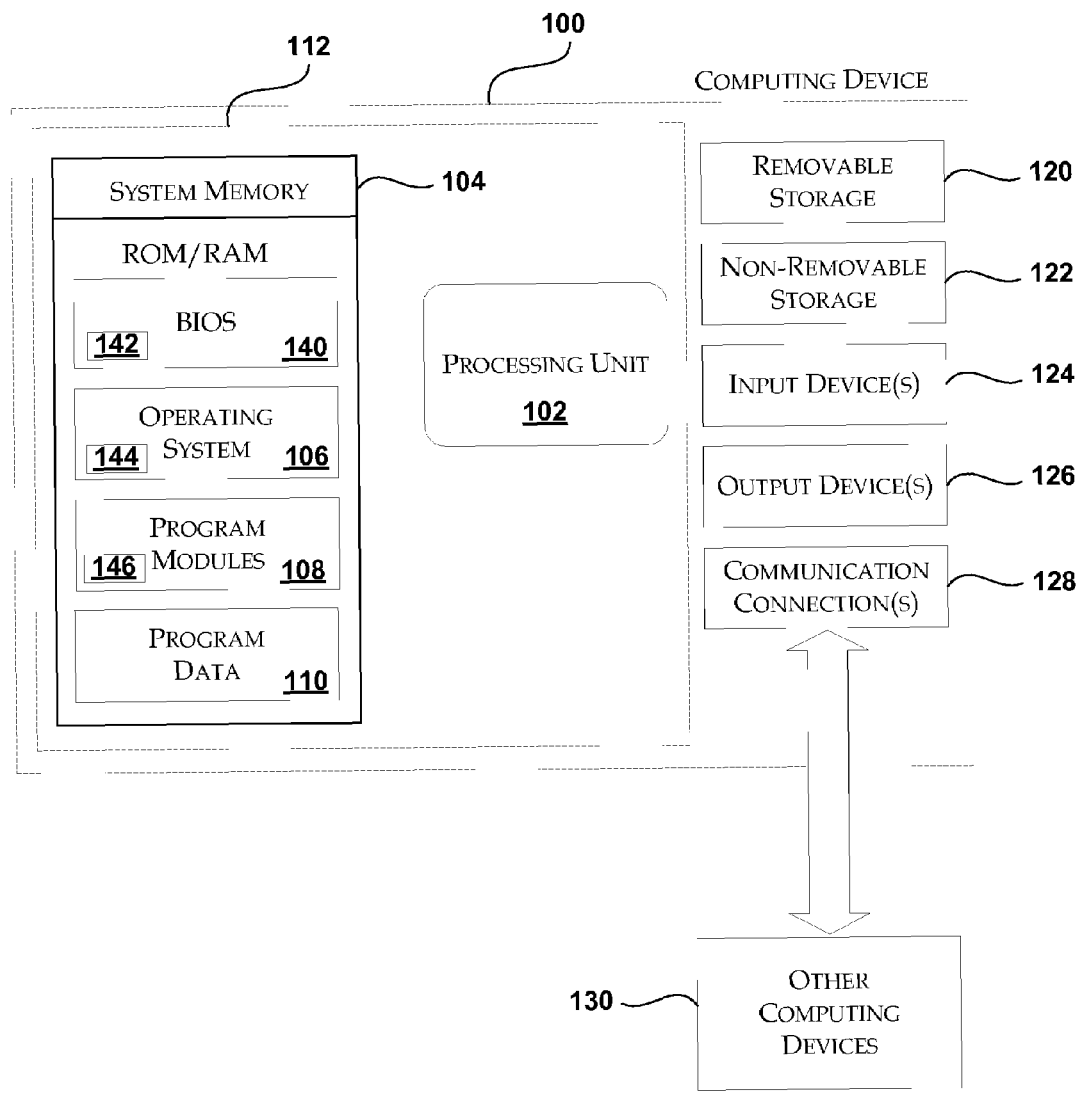
FIG. 1 is an illustrative computing system that may be used to implement the BIOS configuration update technique described herein in accordance with one embodiment.

FIG. 1 is an illustrative computing system that may be used to implement one embodiment of the BIOS configuration update technique described herein. The system includes a computing device, such as computing device 100. Computing device 100 represents any type of computing device such as a personal computer, a laptop, a server, a handheld or mobile device (e.g., a cellular phone, digital assistant), and the like. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes a BIOS 140, an operating system 106, one or more program modules 108, and may include program data 110. For the present BIOS configuration update technique, the BIOS 140 may include one or more components 142 for implementing the BIOS configuration update technique. In addition, operating system 106 may include one or more components 144 for implementing the BIOS configuration update technique. Components 142 and 144 will be described in detail below in conjunction with FIG. 2. Program modules 108 may include a management application 146 that utilizes the BIOS configuration update technique implemented within components 142 and 144. This basic configuration is illustrated in FIG. 1 by those components within dashed line 112.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 120 and non-removable storage 122. Computer storage media may include volatile and nonvolatile, removable and non-removable media implemented in any method or technology for storage of information, such as computer readable instructions, data structures, program modules, or other data. System memory 104, removable storage 120 and non-removable storage 122 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100.

Computing device 100 may also have input device(s) 124 such as keyboard, mouse, pen, voice input device, touch input device, etc. Computing device 100 may also contain communication connections 128 that allow the device to communicate with other computing devices 130, such as over a network, so that application 146 on one computing system may modify hardware settings on another computing system in accordance with the present BIOS configuration update technique. Communication connection(s) 128 is one example of communication media. Communication media may typically be embodied by computer readable instructions, data structures, program modules, or other data. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 2:
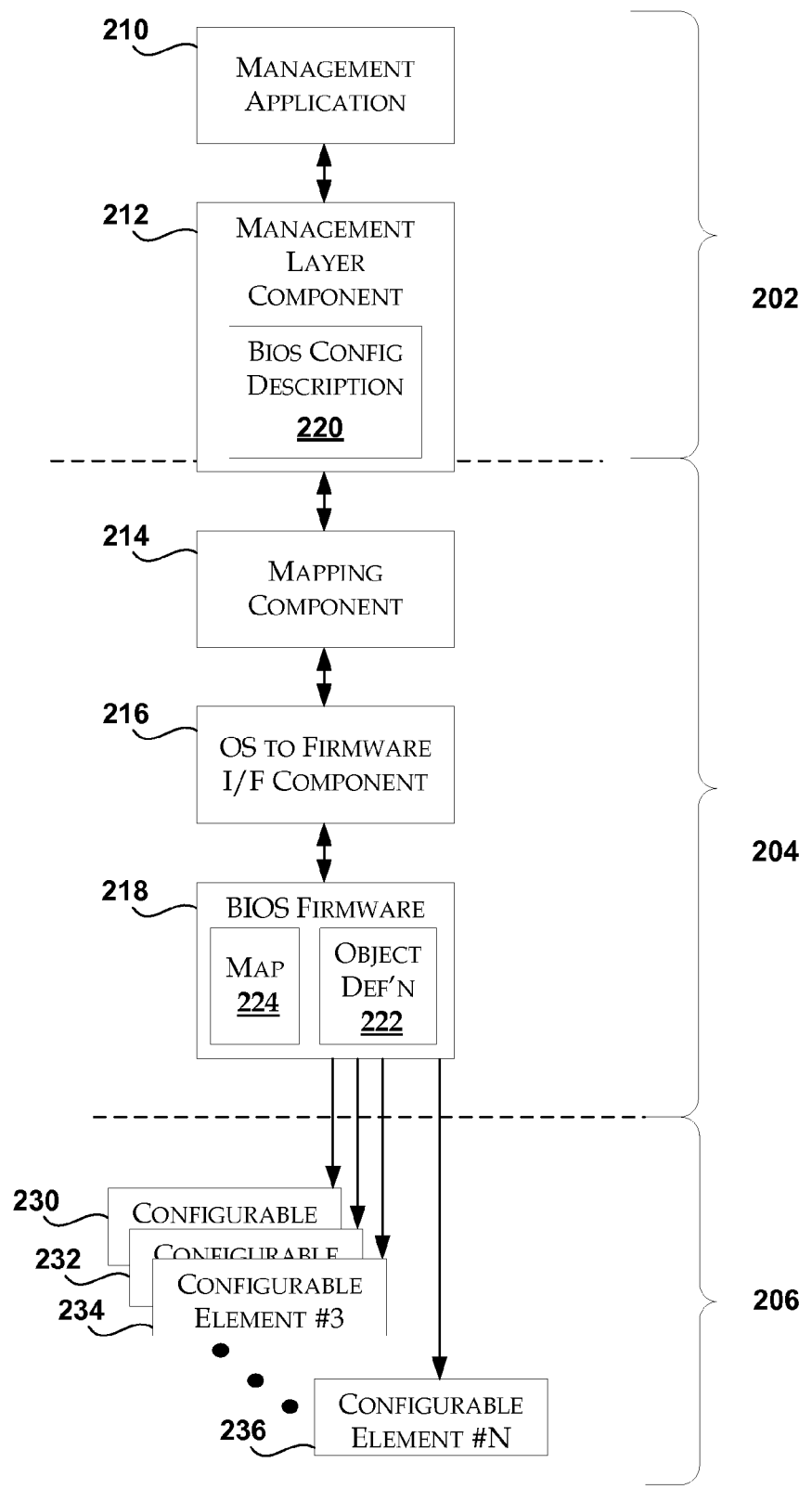
FIG. 2 is a functional block diagram of components embodying one embodiment of the present BIOS configuration update technique which are resident on one or more computing systems, such as the computing system of FIG. 1.

FIG. 2 is a functional block diagram of components embodying one embodiment of the present BIOS configuration update technique which are resident on one or more computing systems, such as the computing system of FIG. 1. Components operating within section 202 operate in an unprivileged mode, commonly referred to as user mode. Components operating within section 204 operate in a privileged mode, commonly referred to as kernel mode. As is known to those skilled in the art, "kernel mode" refers to processing that occurs at the most privileged and protected level of the operating system (os). Kernel mode components reside in protected memory and provide basic operating-system services. "User mode" refers to processing that occurs at the application layer and which does not have general access to kernel mode drivers. Components within section 206 are at a hardware level, such as registers on hardware elements, thereby making the hardware configurable. These hardware components (e.g., configurable elements 230-236) typically have at least one setting that can be modified. The configurable elements may be any type of hardware device, such as a wireless network card, display, CD-ROM drive, and the like.

One embodiment of the present BIOS configuration update technique may utilize several well known components for the management layer component 212, mapping component 214, operating system to board interface component 216, and BIOS 218. For example, the management layer component 212 may include a WINDOWS Management Instrumentation (WMI) system that provides an interface through which instrumented components, in both user-mode and kernel-mode, such as hardware elements, can provide information and notification to a management application 210 in user-mode. BIOS 218 may include Advanced Configuration and Power Interface (ACPI) code (not shown) that includes methods that control features of ACPI-compliant hardware. The ACPI code may be compiled and stored as part of the BIOS. The methods of the ACPI code may then be interpreted and executed by a virtual machine that is embedded in a kernel mode driver (e.g., operating system to board interface component 216), such as the well known ACPI driver that communicates with the features in the ACPI hardware. Mapping component 214 then includes an ACPI-WMI mapping driver that is configured to receive commands from WMI (i.e., management layer component 212), translate the commands into ACPI compliant commands, and issue ACPI compliant commands via the ACPI driver (i.e., OS to board interface component 216). The interaction between these conventional components for the management layer component, mapping component, os to board interface component, and BIOS are well known. However, these components are for illustrative purposes only, and do not limit the applicability of the present BIOS configuration update technique from using other applicable components in other operating environments.

In overview, components 212, 214, 216, and 218 provide a "pipe" through which data flows from a management application 210 to hardware elements 230-236. However, as discussed above, the configuration of BIOS 218 depends on the computer manufacture, BIOS designer, and the like. Thus, a management application 210 does not know how each manufacture configures the BIOS for their computing system, and thus, can not manage the configuration settings on these different computing systems.

However, in accordance with the present BIOS configuration update technique, a BIOS configuration description 220 is provided. In overview, the BIOS configuration description 220 describes a manner in which computer manufacturers define their hardware elements (i.e., configurable elements). In one embodiment, described later in conjunction with FIG. 3, the BIOS configuration description 220 includes a pre-defined schema that details the configurable elements and the potential values for the configurable elements. In another embodiment, described later in conjunction with FIG. 4, the BIOS configuration description 220 includes a set of rules for defining the configurable elements and the potential values for the configurable elements. In a further refinement, object definitions 222 for the configurable elements may be optionally stored in BIOS 218. Briefly, these object definitions, described later in conjunction with FIG. 3, conform to the BIOS configuration description 220. BIOS 218 also includes a map 224. Briefly, map 224, described later in conjunction with FIG. 7, associates a unique identifier with one or more methods for configuring an associated configurable element (s). The unique identifier is defined in the BIOS configuration description and available to the management layer component 212 and management application 210. Therefore, the management application does not need to know the specific unique identifier. Instead, a friendly name and/or object name may be used by the management application to modify the corresponding setting in the BIOS. One will note that management application 210 may execute on the same computing system as the configurable elements (i.e., local mode) or may execute on a different computing system (i.e., remote mode).

FIG. 3 is an example BIOS configuration description implementing a pre-defined schema for a wireless controller that illustrates an exemplary BIOS configuration description of FIG. 2. In one embodiment, the BIOS configuration description 300 may implement an industry standard common information model (CIM). As those skilled in the art appreciate, the CIM uses techniques of object-oriented programming to provide a consistent definition and structure of data for object classes, properties, methods, and the like. In one embodiment, the CIM may be implemented using a Managed Object Format (MOF) language. Thus, for this embodiment, the BIOS configuration description may entail a list of Managed Object Format (MOF) classes. Each MOF class then describes one of the configurable elements.

As mentioned above, the BIOS configuration description may be implemented by pre-defining a schema. The pre-defined schema is then utilized by the manufacturers when designing their BIOS. Because the schema is pre-defined, management applications are aware of the schema when the management application is developed. Thus, the management application incorporates this knowledge of the schema into the code for the management application. FIG. 3 illustrates one format for pre-defining a configurable element in an exemplary pre-defined schema.

The BIOS configuration description 300 includes metadata 310, class information 330, and property information 350. Metadata 310 describes qualifiers about a configurable element or a property of the configurable element. For example, in the example schema 300, metadata 310 includes a first metadata qualifier 312 (e.g., "WMI") that specifies the type of the management layer component that is supported. A second metadata qualifier 314 (e.g., "Dynamic") specifies that the value of the configurable element is discovered each time a management application queries the value. A third metadata qualifier 316 (e.g., "Provider") and a corresponding metadata value 317 (e.g., "WMIProv") specifies which management layer sub-component (also known as a provider) is responsible for retrieving the configurable element value. In other words, qualifier 317 and metadata value 317 specify details to the management layer component on how to access the configurable elements. A fourth metadata qualifier 318 (e.g., "DisplayName") and corresponding metadata value 319 (e.g., "Onboard 802.11x Wireless Controller Configuration") specify a display name associated with the configurable element being defined. A fifth metadata qualifier 320 (e.g., "Description") and corresponding metadata value 321 (e.g., "Configures the onboard 802.11x wireless controller") specifies a description for the associated configurable element being defined. A sixth metadata qualifier 322 (e.g., "Locale") and corresponding metadata value 323 (e.g., "ox409) specify the textual locale (for localization of text for multiple geographies and languages) of the DisplayName 318 and Description 320. A seventh metadata qualifier 324 (e.g., "GUID") and corresponding metadata value 325 (e.g., "2E5EC0CD-748F-4e3f-B63D-6FCBF5AEB60F") specify a unique identifier for the configurable element. As will be described later, this unique identifier is used by the BIOS to identify a method for modifying a configuration setting on the associated configurable element. While several metadata qualifiers are illustrated in FIG. 3, the BIOS configuration description may define only a subset of these metadata qualifiers, may define additional metadata qualifiers, or the like. In addition, the textual name illustrated in FIG. 3 may be modified. As long as the schema is pre-defined and adhered to by the developers of the management application and the BIOS implementors, the resultant format and naming convention may be one of several forms.

As mentioned above, the BIOS configuration description 300 also includes class information 330 and property information 350. The class information 330 identifies a class 332 (e.g., "Onboard80211 Wireless") which may inherit from other classes 333 (e.g., MS_BIOSSettings). Class information 330 may also include two variables 334 (e.g., string InstanceName) and 336 (e.g., Boolean Active) and their corresponding attribute 335 (e.g., "[read, key]") and attribute 337 (e.g., "[read]"), respectively. These variables may be used to by the management application to ensure that there is one instance of the configurable element object in existence at one time. The use of attributes with variable declarations is well known in the art. Once the class information 330 is defined, the property information 350 is defined. BIOS configuration description 300 only illustrates one property information 350 associated with class 332, however, multiple property information may be defined for one configurable element in the same manner. Each property information 350 is defined within a grouping of the class and identified by a property identifier 339 and property number 338. Within each property information 350, there are several qualifiers (e.g., qualifiers 340-348). Some of the qualifiers have an associated value, such as qualifiers 342-348. A permission qualifier 340 identifies whether the associated property may be read and/or written. A property display name qualifier 342 is associated with a property display name data 342 and specifies whether a property display name is enabled or disabled. In other words, the property display name qualifier 342 controls whether a user interface for modifying the BIOS settings can show a display name for the property. A property description qualifier 344 is associated with a property description data 345 and specifies a description that can be displayed if the display name qualifier is enabled. A value qualifier 346 is associated with value data 347 and specifies strings which may appear on the user interface for the associated property. The value data may be in the form of a zero indexed list where the first string is associated with a value of 0 and so on. A default qualifier 348 is associated with a default value 349 and identifies the default value which is displayed in the user interface initially or upon reset of the associated configurable element. Property information 350 also includes a declaration for a property 352 (e.g., "Boolean Enable").

Thus, schema 300 predefines the configurable elements and the associated metadata. Therefore, the management applications knows about this schema during development time and can determine how to interact with any particular setting when the management application is developed. However, even though the DisplayName and Descriptions are defined in the schema, a management application may use its own display names and descriptions for the associated configurable element. Pre-defined schema 300 is distributed to computer manufacturers so that the BIOS for their computing systems can conform to the schema.

In another embodiment, schema 300 is not pre-defined, but rather the BIOS configuration description specifies the rules for describing schema elements. These rules then provide a framework-based schema which is provided before development of a management application. The actual schema code is provided after the management application has been developed. Therefore, management applications can be created without knowing the entire list of configurable elements in the BIOS configuration schema. The rules may specify the use of the qualifiers defined above in the pre-defined schema, but allow the actual values associated with the qualifiers to be determined by the computer system manufacturer.

Figure 4:
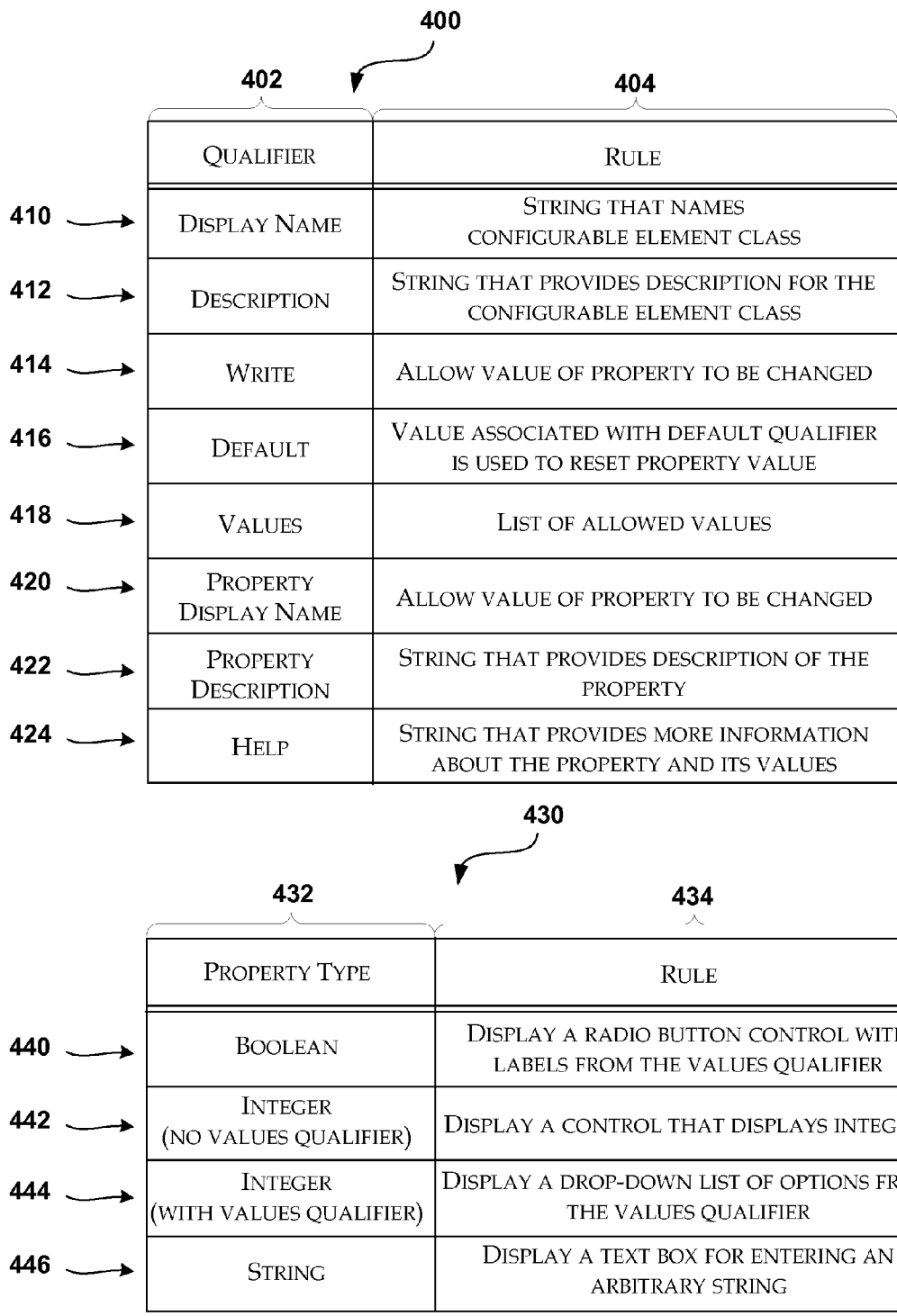
FIG. 4 is an example BIOS configuration description implementing a framework-based schema that illustrates another exemplary BIOS configuration description of FIG. 2.

FIG. 4 is an example BIOS configuration description implementing a framework-based schema that illustrates another exemplary BIOS configuration description of FIG. 2. The exemplary framework-based schema is illustrated using two tables 400 and 430. Table 400 has two columns 402 and 404 for specifying a qualifier and its associated rule. Each line 410-424 then specifies one of the qualifiers in the exemplary framework-based schema and its associated rule. The qualifiers may include a display name qualifier 410, a description qualifier 412, a write qualifier 414, a default qualifier 416, a values qualifier 418, a property display name qualifier 420, a property description qualifier 422, and a help qualifier 424. Many of these qualifiers have a corresponding qualifier described above for the pre-defined schema. Therefore, for brevity, a description of these qualifiers is not repeated. One will note that the framework-based schema provides guidance on how to generate and interact with schema code that describes the configurable elements of a computing system. In overview, Table 430 specifies one exemplary technique (i.e., rule column 434) for building a user interface based on the type of property (i.e., property type column 432) that is defined. For example, row 440 specifies that a radio button control is displayed with labels from the value qualifier 418 if the property is a Boolean type; row 442 specifies that a control that displays integers is displayed if the property is an integer type and no value qualifier was identified; for 444 specifies that a drop-down list of options from the value qualifier is displayed if the property is an integer type and a value qualifier is identified; and row 446 specifies that a text box is displayed for entering an arbitrary string if the property is a string type. In addition, the framework-based schema may specify the manner in which multiple properties are defined and the like.

Figure 5:
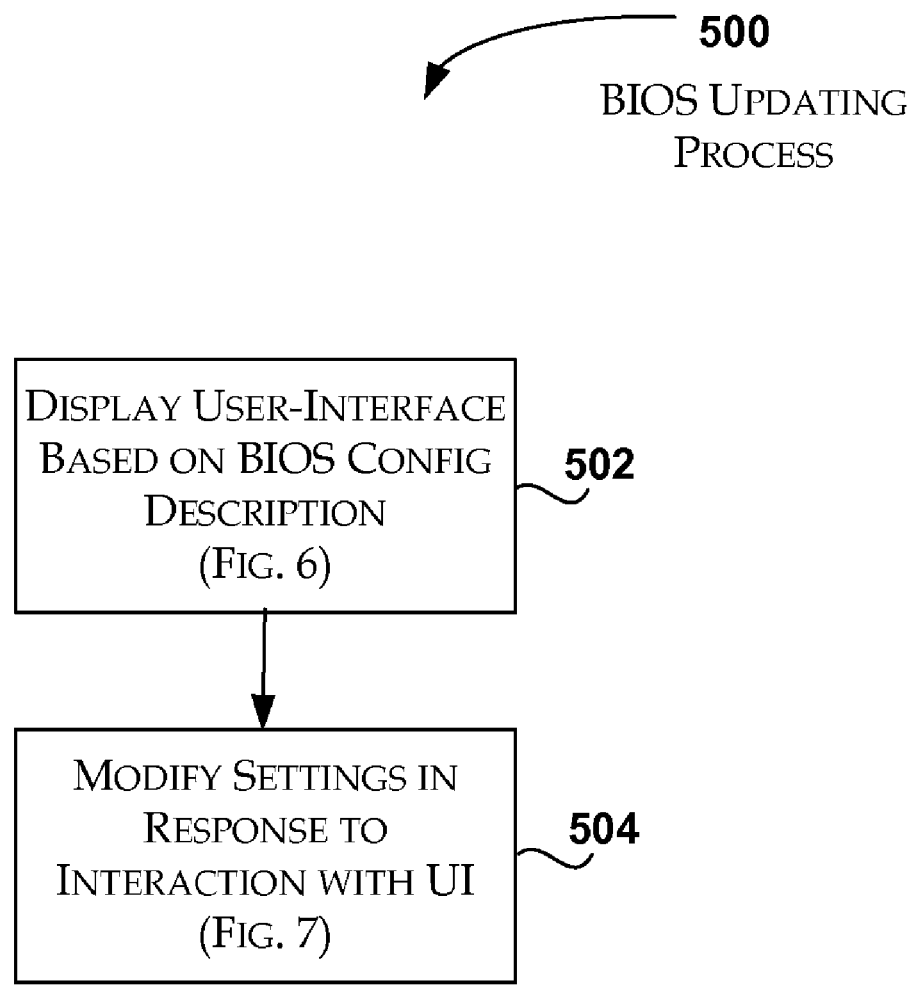
FIG. 5 is a flow diagram illustrating one embodiment of an exemplary BIOS updating process.

FIG. 5 is a flow diagram illustrating one embodiment of an exemplary BIOS configuration updating process 500. The BIOS configuration updating process 500 begins at block 502 and may utilize the pre-defined schema and/or the framework-based schema. At block 502, a user-interface is displayed based on the BIOS configuration description. If the BIOS configuration description utilizes the pre-defined schema, the management application may have the user-interface already coded because each of the configurable elements is known when the management application is developed. If the BIOS configuration description utilizes the framework-based schema, the management application will need to build the user-interface at runtime. One exemplary process of building the user-interface at runtime will be described in conjunction with FIG. 6. Processing continues at block 504.

Figure 7:
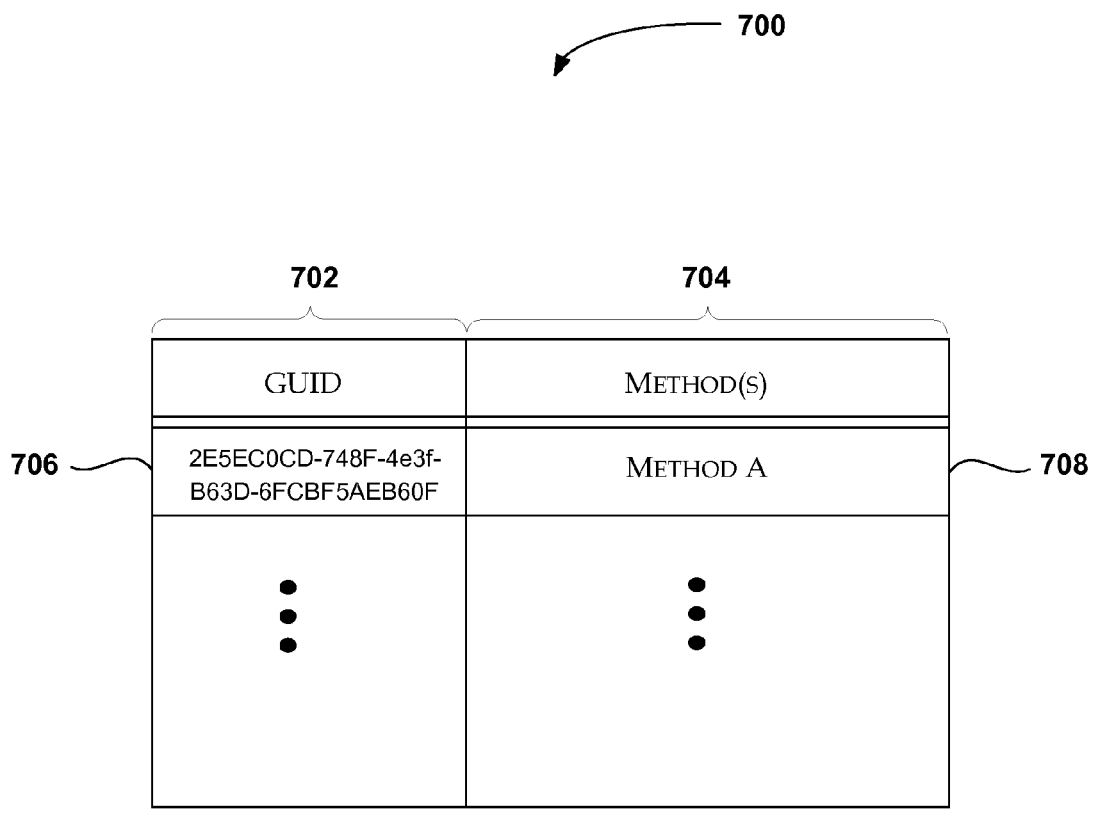
FIG. 7 is an illustrative table that shows a mapping between BIOS methods and configurable elements within the computing system of FIG. 1 suitable for use in FIG. 4 when modifying settings of the configurable elements.

At block 504, settings specified during interactions with the user interface are modified in the configurable elements. Typically, the user interface includes an update button that may be selected. When the update button is selected, the modifications made in the user interface are determined and these modifications are then sent to the associated configurable elements to update. Because each user interface element is associated with a configurable element and each configurable element has a unique identifier, the management application can pass the value for updating to the configurable element via the management layer. The management layer passes the value to the configurable element through the pipe based on the unique identifier. FIG. 7 is an illustrative table that shows a mapping between BIOS methods and configurable elements within the computing system of FIG. 1 suitable for use in FIG. 5 when modifying settings of the configurable elements. As shown in FIG. 7, the BIOS map 700 associates a unique identifier (e.g., GUID) 702 with one or more methods 704. These methods take the value (if any) and modify the settings of the associated configurable element. For example, the "Onboard80211 Wireless" board was associated with "2E5EC0CD-748F-4e3f-B63D-6FCBF5AEB60F" GUID. Using map 700, method A 708 is invoked to modify the settings of the "Onboard80211 Wireless" board.

Figure 6:
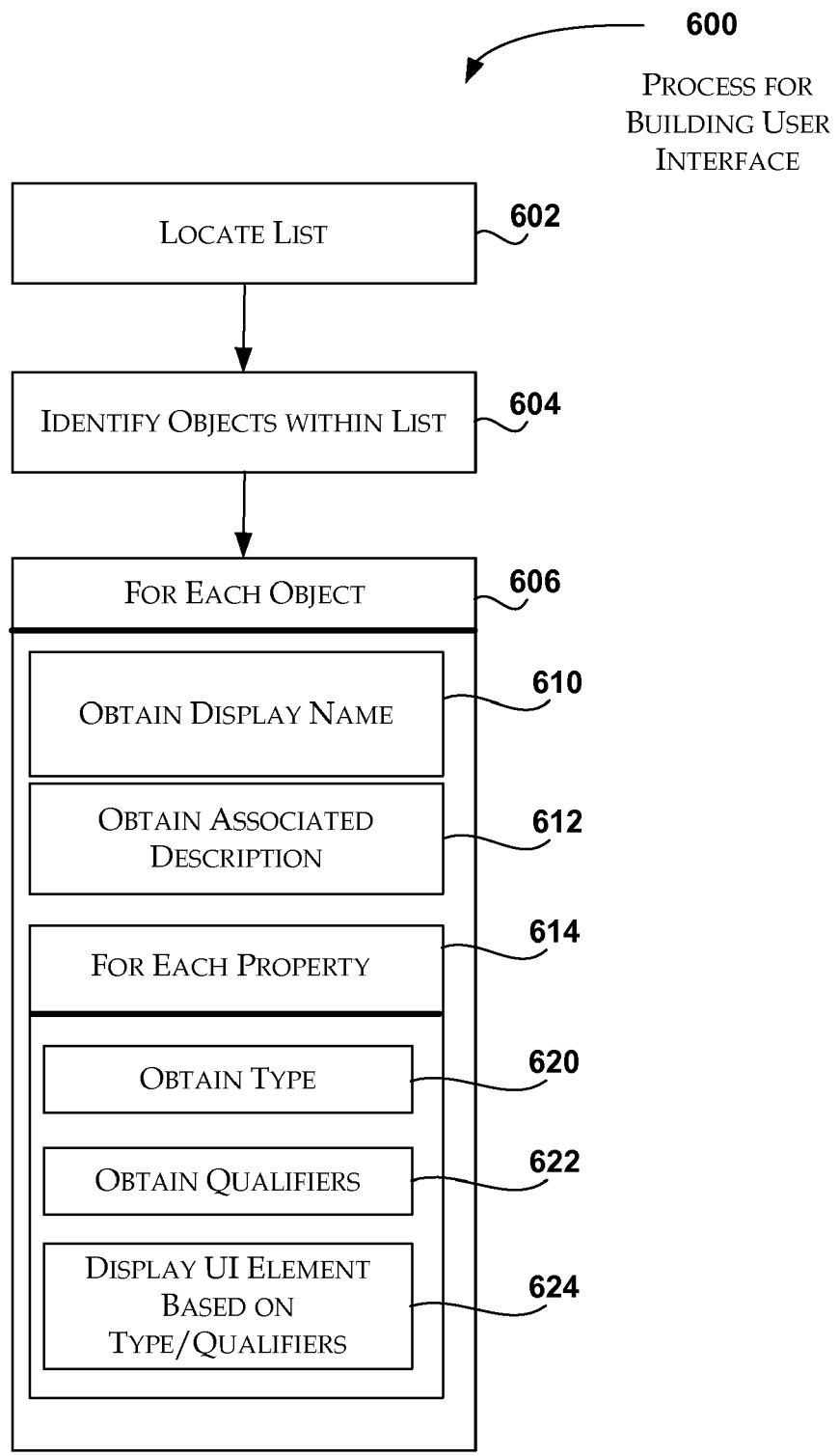
FIG. 6 is a flow diagram illustrating one embodiment of a process for building a user-interface based on the BIOS configuration description.

FIG. 6 is a flow diagram illustrating one embodiment of a process 600 for building a user-interface at runtime based on the BIOS configuration description. Process 600 begins at block 602 where a list is located. In one embodiment, the location may be a pre-defined namespace, such as root\\wmi\\bios. Adding the objects to this namespace is well known and is typically done when the computing system is booted. Processing continues at block 604.

At block 604, objects are identified within the list. Processing continues at block 606.

At block 606, for each object that is located, blocks 610, 612, and 614 are performed. Block 610 obtains a display name for the configurable element. Block 612 obtains an associated description for the configurable element. Block 614 is performed for each property of the object and includes block 620, 622, and 624. Block 620 obtains a type for the property. Block 622 obtains the qualifiers for the property. Block 624 displays a user interface element for the property based on the type and qualifiers according to the rules specified in the framework-based schema shown in Table 430 of FIG. 4. Once all the properties of the object and each object have been processed, the user interface is built and ready for interactions with a user.

Thus, as described, the present BIOS configuration update technique successfully manages hardware elements on computing systems from various manufacturers. A management application may be "hard coded" with a user-interface based on the pre-defined schema or may build a user-interface at runtime based on the framework-based schema. The user interface can thus accommodate BIOS configurations of various manufacturers and allows interactions with one convenient user-interface to modify any settings in the configurable elements. While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. At least one computer-readable media storing computer-executable instructions for performing a method, the method comprising:

locating a list;

identifying a plurality of objects within the list, each object being defined based on a bios configuration description and being associated with a configurable element within a computing system that is accessible via a basic input/output system associated with the computing system; and modifying a setting of the configurable element based on an associated object of the plurality of objects via an application residing in a user area of a system memory of the computing system;

wherein the bios configuration description comprises a set of rules for defining the plurality of objects;

wherein the set of rules includes qualifiers to use when defining the configurable element in a desired format and the set of rules allow the actual values associated with the qualifiers to be determined by a manufacturer of the computing system;

wherein the qualifiers and set of rules include:

a display name qualifier associated with a display name rule, wherein the display name rule is "string that names configurable element class;"

a description qualifier associated with a description rule, wherein the description rule is "string that provides description for the configurable element class";

a write qualifier associated with a write rule, wherein the write rule is "allow value of property to be changed";

a default qualifier associated with a default rule, wherein the default rule is "value associated with default qualifier is used to reset property value;"

a values qualifier associated with a values rule, wherein the values rule is "list of allowed values";

a property display name qualifier associated with a property display name rule, wherein the property display name rule is "allow value of property to be changed";

a property description qualifier associated with a property description rule, wherein the property description rule is "string that provides description of the property";

a help qualifier associated with a help rule, wherein the help rule is "string that provides more information about the property and its values."

2. The computer-readable media of claim 1, wherein the bios configuration description comprises a schema specifying a pre-defined format for defining the plurality of objects.

3. The computer-readable media of claim 2, wherein the schema includes a unique identifier associated with the configurable element.

4. The computer-readable media of claim 3, wherein modifying the at least one setting comprises executing at least one method associated with the unique identifier.

5. The computer-readable media of claim 1, wherein the desired format comprises a managed object format.

6. A computing system, comprising:

a processor;

a memory into which a plurality of instructions are loaded, the plurality of instructions performing a method for configuring a configurable element when executed by the processor, the method comprising:

a) obtaining a location for a list;

b) identifying an object within the list based on a configuration description, the object being associated with the configurable element;

c) identifying a property from the list associated with the object;

d) obtaining a type and at least one qualifier associated with the property; and e) displaying a user-interface element based on the type and at least one qualifier;

wherein the configuration description comprises a set of rules that are conformed to when defining the configurable element in a basic input/output system of the computing system; and wherein the set of rules includes qualifiers to use when defining the configurable element in a desired format and the set of rules allow the actual values associated with the qualifiers to be determined by a manufacturer of the computing system.

7. The system of claim 6, wherein the location comprises a pre-defined namespace.

8. The system of claim 6, wherein the configuration description comprises a pre-defined schema for defining the configurable element in a basic input/output system of the computing system.

9. The system of claim 6, further comprising modifying the configurable element based on an interaction with the user interface element.

* * * * *